(12) United States Patent
Donald

(10) Patent No.: US 6,443,504 B1
(45) Date of Patent: Sep. 3, 2002

(54) SLIDING DOOR LATCH WITH FINGER PULL LEVER

(75) Inventor: Joseph G. Donald, Cameron Park, CA (US)

(73) Assignee: Emhart LLC, Newark, DE (US)

(*) Notice: Subject to any disclaimer, the term of this patent is extended or adjusted under 35 U.S.C. 154(b) by 0 days.

(21) Appl. No.: 09/501,335

(22) Filed: Feb. 9, 2000

(51) Int. Cl.[7] ............................................... E05C 5/00
(52) U.S. Cl. ....................... 292/110; 292/95; 292/109; 292/DIG. 46
(58) Field of Search ...................... 292/97, 122–124, 292/DIG. 46, 95, 109–111

(56) References Cited

U.S. PATENT DOCUMENTS

| | | | |
|---|---|---|---|
| 2,731,821 A | 1/1956 | Lloyd | |
| 2,736,185 A | * 2/1956 | Collar | 292/97 |
| 2,784,019 A | 3/1957 | Combes | |
| 5,098,139 A | * 3/1992 | Larsson | 292/97 |
| 5,172,520 A | * 12/1992 | Hostetler et al. | 292/207 X |
| 5,452,928 A | 9/1995 | Donald | 292/254 |
| 5,529,351 A | 6/1996 | Donald | 292/254 |
| 5,676,408 A | * 10/1997 | Davidian | 292/197 |
| 5,816,629 A | 10/1998 | Donald | |
| 5,820,170 A | * 10/1998 | Clancy | 292/26 |
| 5,927,770 A | 7/1999 | Huang | |
| 6,264,252 B1 | * 7/2001 | Clancy | 292/196 |

* cited by examiner

Primary Examiner—Anthony Knight
Assistant Examiner—Ruth C. Rodriguez
(74) Attorney, Agent, or Firm—Harness, Dickey & Pierce, P.L.C.

(57) ABSTRACT

A sliding door latch with a finger pull mechanism is described that fits within a standardized aperture normally utilized for a hinged door latch. Provided is a latch assembly having an extendable latching hook for mounting in a sliding door and latching with a strike plate mounted in a door frame and a finger pull mechanism for accessing the sliding door from within a surrounding framework. Included are a housing assembly for fitting within the sliding door, an exposed edge plate mounted to the edge of the sliding door beside the housing assembly, a latching hook for engaging with the strike plate and extendable through the exposed edge plate, and a finger pull mechanism mounted in the edge plate.

18 Claims, 12 Drawing Sheets

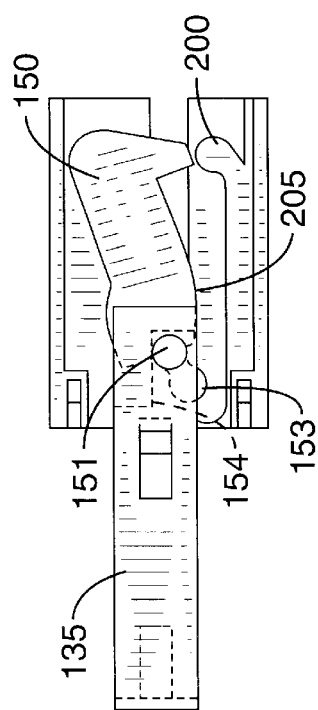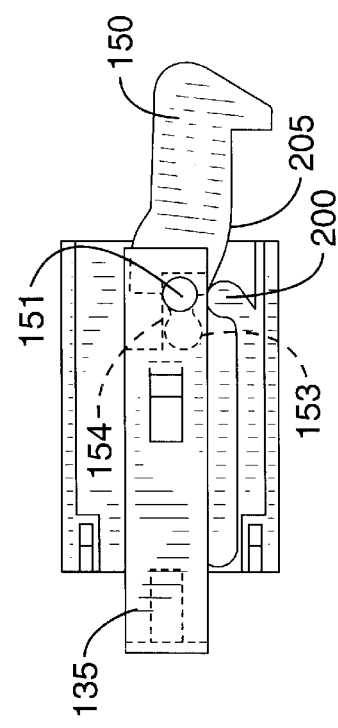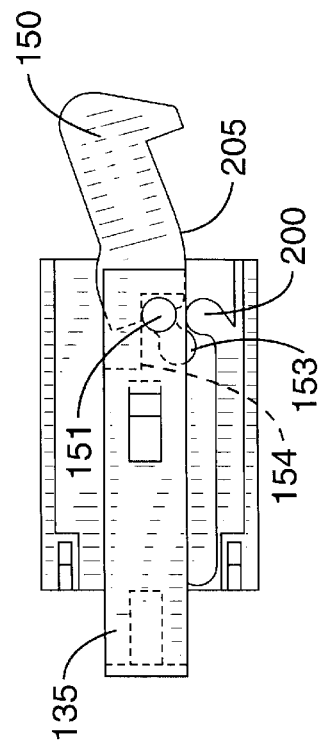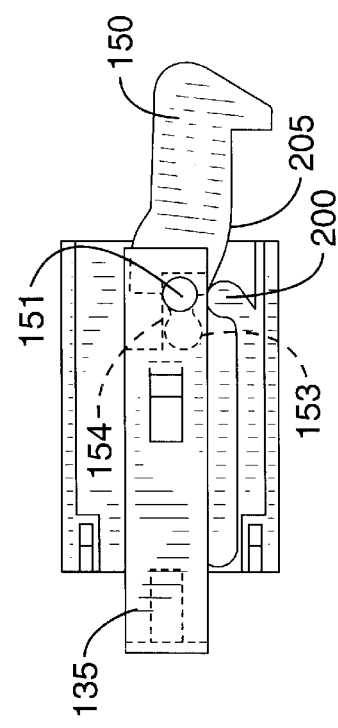

SLIDING DOOR LATCH WITH FINGER PULL LEVER

BACKGROUND OF THE INVENTION

1. Field of the Invention

Disclosed is a latching mechanism for a sliding door that includes a extendable hooking means and an edge plate having a finger pull. More specifically, an improved sliding or pocket door latching device is provided that includes a latching mechanism having a single hooking lever adapted with resilient means for engaging a strike plate. To access the sliding door from within the surrounding sliding door framework, a finger pull is fitted into the edge plate, above an aperture for receiving the hooking lever.

2. Description of the Background Art

Door latches for pocket or sliding doors exist in various forms. A traditional sliding door latch comprises a device the fits into the door within an often rectangular aperture that extends inward from the edge of the door (a type of large "notch" cut into the edge of the door) or by some other "custom" aperture forming procedure. The difficulty with these types of sliding door lock receiving apertures is that most doors are not for use in a pocket door setting, but are configured with apertures designed to receive standard locking mechanism found in hinged-type or hung doors. Additionally, when a door needs to be cut for receiving a locking assembly in a fashion that is not in a standard configuration, the chance of a door damaging or ruining error is significant. A standard configuration for a hung door comprises a first bore of about 2⅛ inch cut through a face of the door. A second bore of about 1" enters from the edge of the door and meets the larger bore on its perimeter. An inset rectangular region is formed in the edge of the door about the second bore for holding an edge plate. The subject invention allows this type of door configuration or preparation to be utilized not only for hung door but for a sliding or pocket door too, thereby standardizing the preparation of doors for both hinged and sliding uses.

SUMMARY OF THE INVENTION

An object of the present invention is to disclose, for use with a sliding door, an improved latching mechanism having a finger access means included in a hinged-door standardized edge plate that has means for fastening to an edge of the sliding door.

Another object of the present invention is to provide an improved sliding door latch that repeatedly, reliably, and securely holds a sliding door closed against a strike plate mounted in a door frame and provides an integrated handle or finger access means for accessing the door from within a containing pocket mounted in a wall.

A further object of the present invention is to disclose an improved simple latching pocket door mechanism having a finger pull that utilizes a guided single latching lever that engages with a receiving strike plate mounted in a door frame.

Still another object of the present invention is to describe an improved sliding door mechanism having a retracting finger pull pivotally secured within an end plate and utilizes a single spring associated lever and guiding means for engaging and latching with a receiving strike plate mounted in a door frame.

Disclosed is a latch assembly for mounting to a sliding door and engaging with a wall mounted strike plate that comprises a housing assembly that fits within the sliding door, an edge plate having means for affixing to an edge of the sliding door and positioning the edge plate beside the housing assembly, means associated with the housing assembly for coupling with the strike plate, wherein when coupling with the strike plate a portion of the coupling means extends through the edge plate, and a finger pull means associated with the edge plate for accessing the sliding door from within a surrounding framework. The finger pull means comprises a finger pull member having first and second ends, finger grasping means proximate the finger pull member first end, and face plate attachment means proximate the finger pull member second end.

More specifically, the subject invention comprises an elongated housing assembly having first and second ends that fits within the sliding door and a rectangular edge plate having a narrower top and bottom borders and wider side borders. The edge plate comprises means for affixing to an edge of the sliding door and positioning the rectangular edge plate proximate the housing assembly second end, an upper finger pull mounting channel, and a lower aperture for receiving a hook member. Included is a hook assembly mounted in the housing assembly for releasably hooking to the strike plate, wherein when releasably hooked with the strike plate a portion of the hook assembly extends through the lower aperture. Also comprising the subject invention is and a finger pull associated with the edge plate for accessing the sliding door from within a surrounding framework. The finger pull comprises a finger pull member having first and second ends, finger grasping means at the finger pull member first end, and face plate attachment means hinged to the edge plate top border.

The hooking means comprises a hook and means-for allowing a user to extend and retract the hook by using a handle. Additionally, the extension and retraction means comprises a handle attachment means, a biased arm member connected to the handle attachment means, means for coupling the biased arm member to the hook, and means for engaging, upon extension, and releasing, upon the retraction, the hook with the strike plate. Two embodiments of the coupling means are included. A first embodiment of the coupling means comprises a bracket fastened from the biased arm member to the hook, pivot means associated with the hook, and means associated with the hook and the housing for partially rotating the hook about the pivot means upon extension and retraction of the hook.

The second embodiment of the coupling means comprises an L-shaped coupler fastened from the biased arm member to the hook, pivot means associated with the hook, and means associated with the hook, the housing, and the edge plate for partially rotating the hook about the pivot means upon extension and retraction of the hook.

Other objects, advantages, and novel features of the present invention will become apparent from the detailed description that follows, when considered in conjunction with the associated drawings.

BRIEF DESCRIPTION OF THE DRAWINGS

FIG. 3 is a cross sectional drawing taken along lines 3—3 in FIG. 2 for the first embodiment of the subject invention.

FIG. 4a is a partial top sectional view of the first embodiment of the subject invention showing the latching hook fully retracted.

FIG. 4b is a partial top sectional view of the first embodiment of the subject invention showing the latching hook partially extended.

FIG. 4c is a partial top sectional view of the first embodiment of the subject invention showing the latching hook fully extended.

DESCRIPTION OF THE PREFERRED EMBODIMENT

Figure 1:
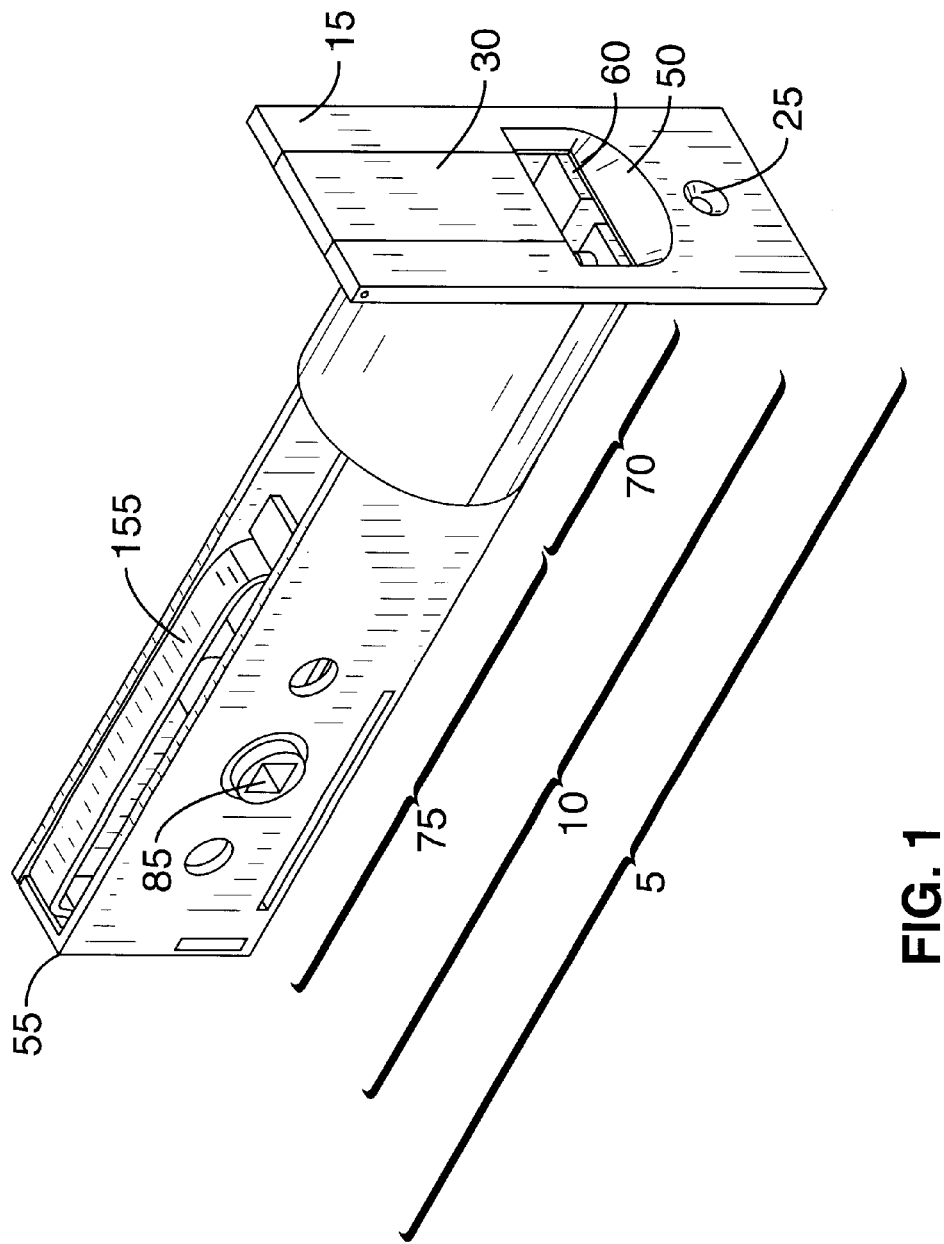
FIG. 1 is a perspective view of a first embodiment of the subject invention.
Figure 2:
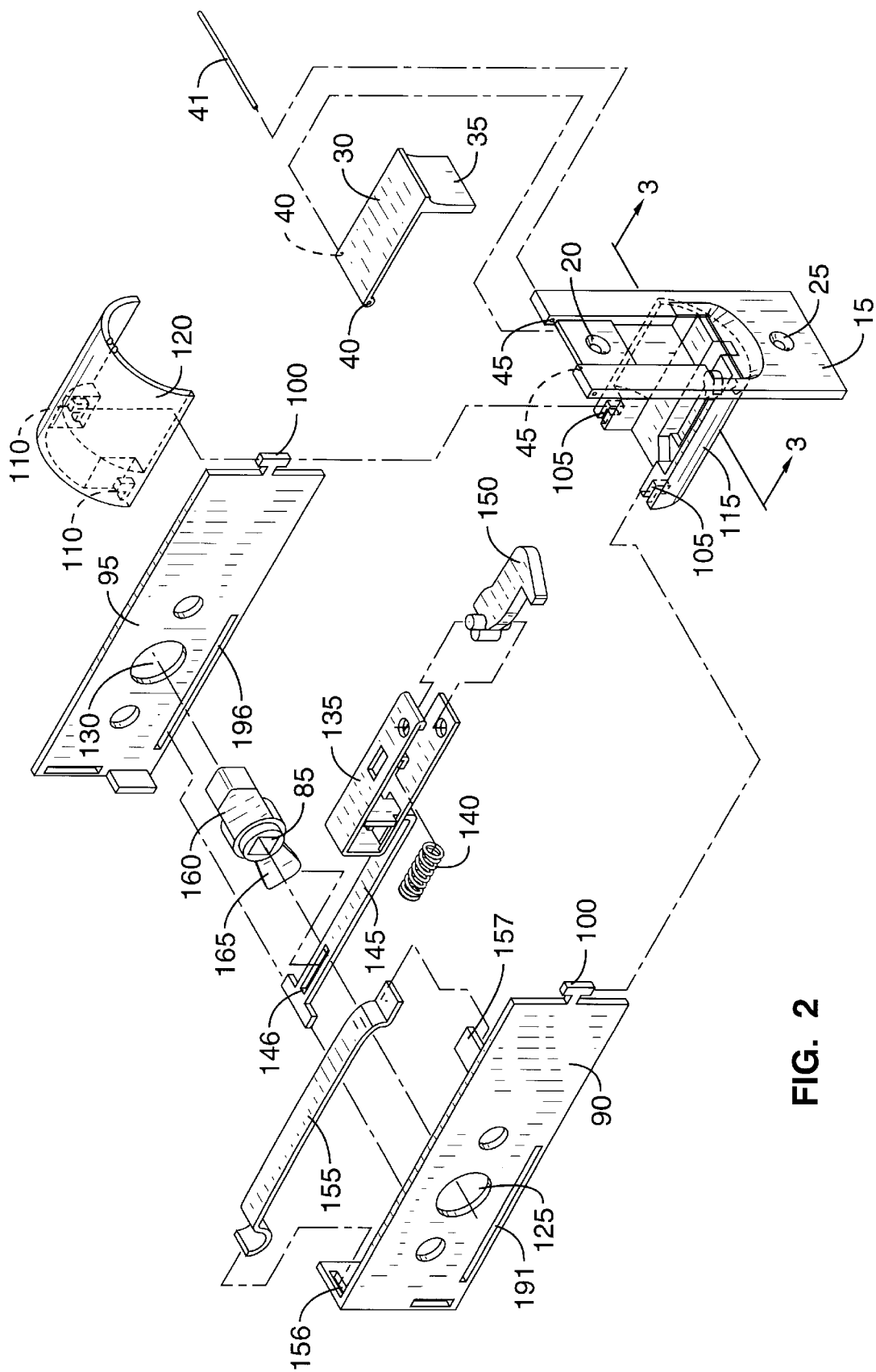
FIG. 2 is an exploded view of the first embodiment of the subject invention.

Referring now to FIGS. 1–11, there are shown preferred embodiments of the subject invention for use with a sliding or pocket door. The sliding door itself is mounted in a pocket frame or equivalent structure that fits within a wall. When a user desires to close the door, the door is slid out of the pocket. The subject invention provides the user with a means for accessing the door from within its pocket frame and for locking the closed door (slid out of its pocket) against a strike plate mounted on the frame of the door opening.

Specifically, a first embodiment of the subject invention is shown in FIGS. 1–7 and comprises a latch assembly 5 having a housing assembly 10 and an edge plate 15. The housing assembly 10 is positioned next to, beside, or contacting the edge plate 15 and the two may be permanently or reversibly attached to one another by standard means or merely positioned against one another within the door bores and held in place by end plate affixing means that are usually apertures 20 and 25 (see specifically FIGS. 1, 2, and 7) through which securing screws are placed (not shown). A finger pull means is associated with the end plate 15 and usually comprises a finger pull member 30 with a finger grasping tab 35 at one end and a hinge means at the other, wherein the hinge means usually comprises a pin aperture 40 in the finger pull member 30 and a pin 41 that fits within receiving apertures 45 in the top edges of the finger pull opening of the end plate 15. Additionally, the end plate 15 contains a latch hook aperture 50 positioned below the finger pull member 30 through which a coupling means accesses and latches to the strike plate in the door frame.

Figure 6A:
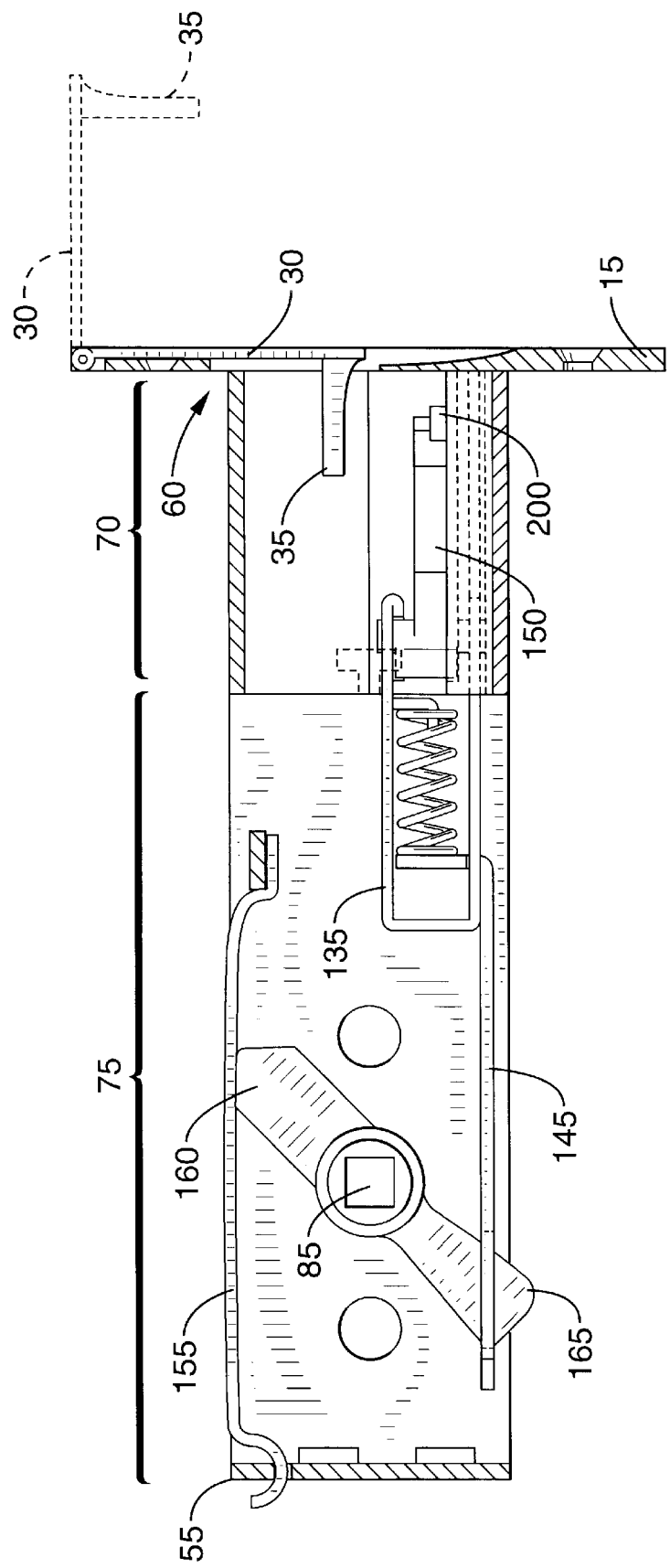
FIG. 6a is a cross sectional view of the first embodiment of the subject invention showing the latching hook in its retracted position and the movement of finger pull.
Figure 6B:
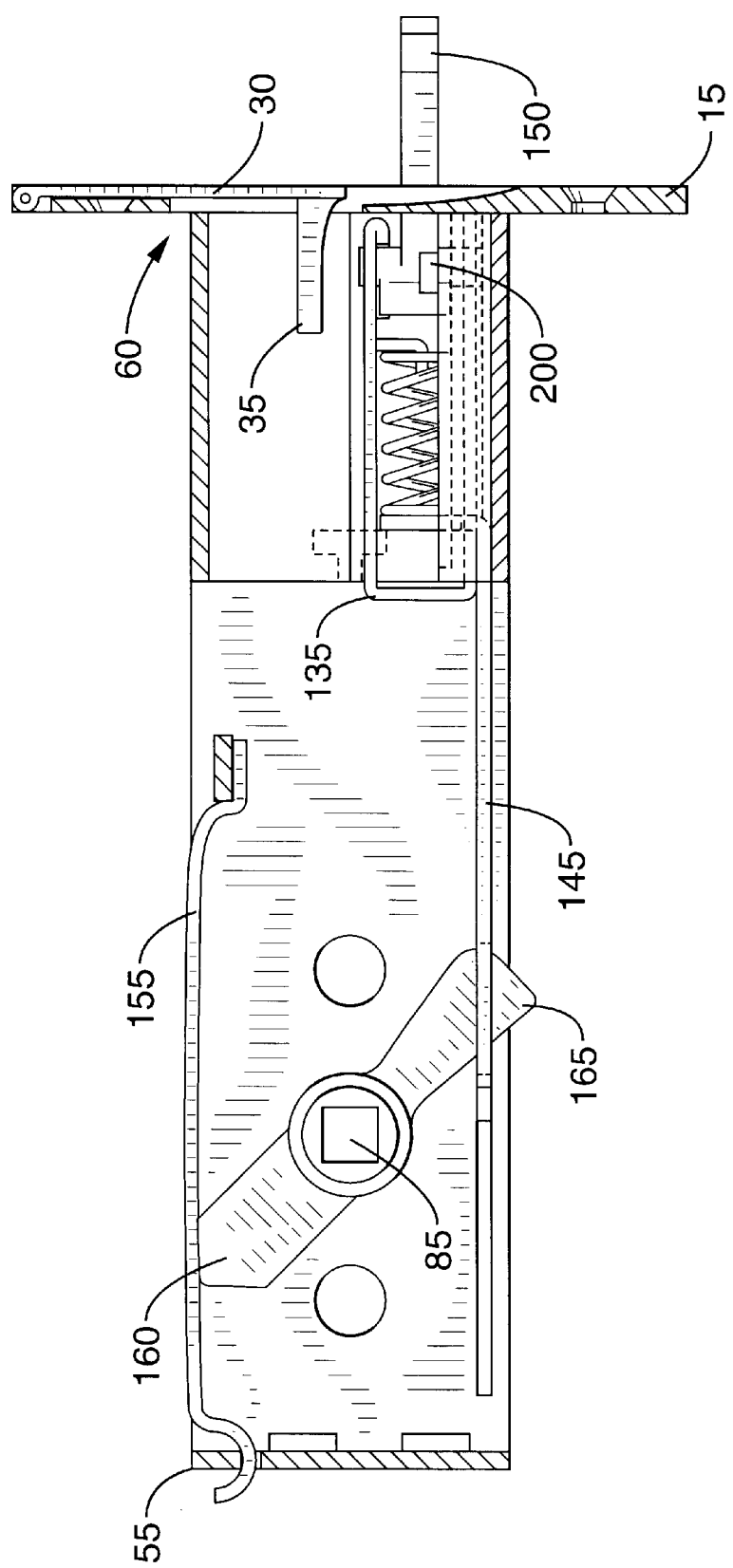
FIG. 6b is a cross sectional view of the first embodiment of the subject invention showing the latching hook in its extended position.
Figure 7:
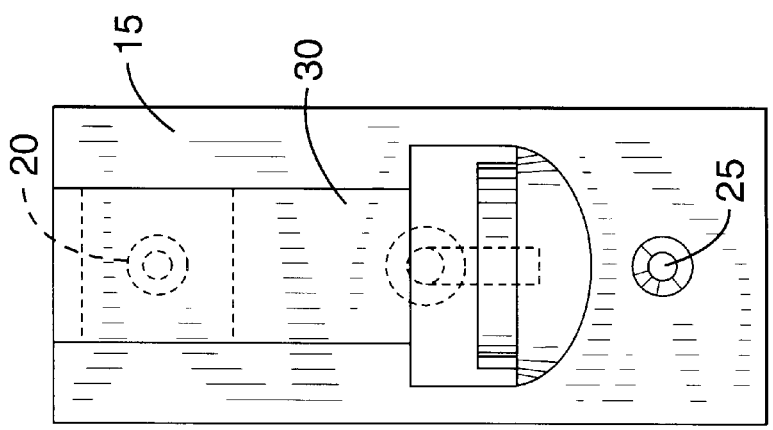
FIG. 7 is an end view of the first embodiment of the subject invention.
Figure 8:
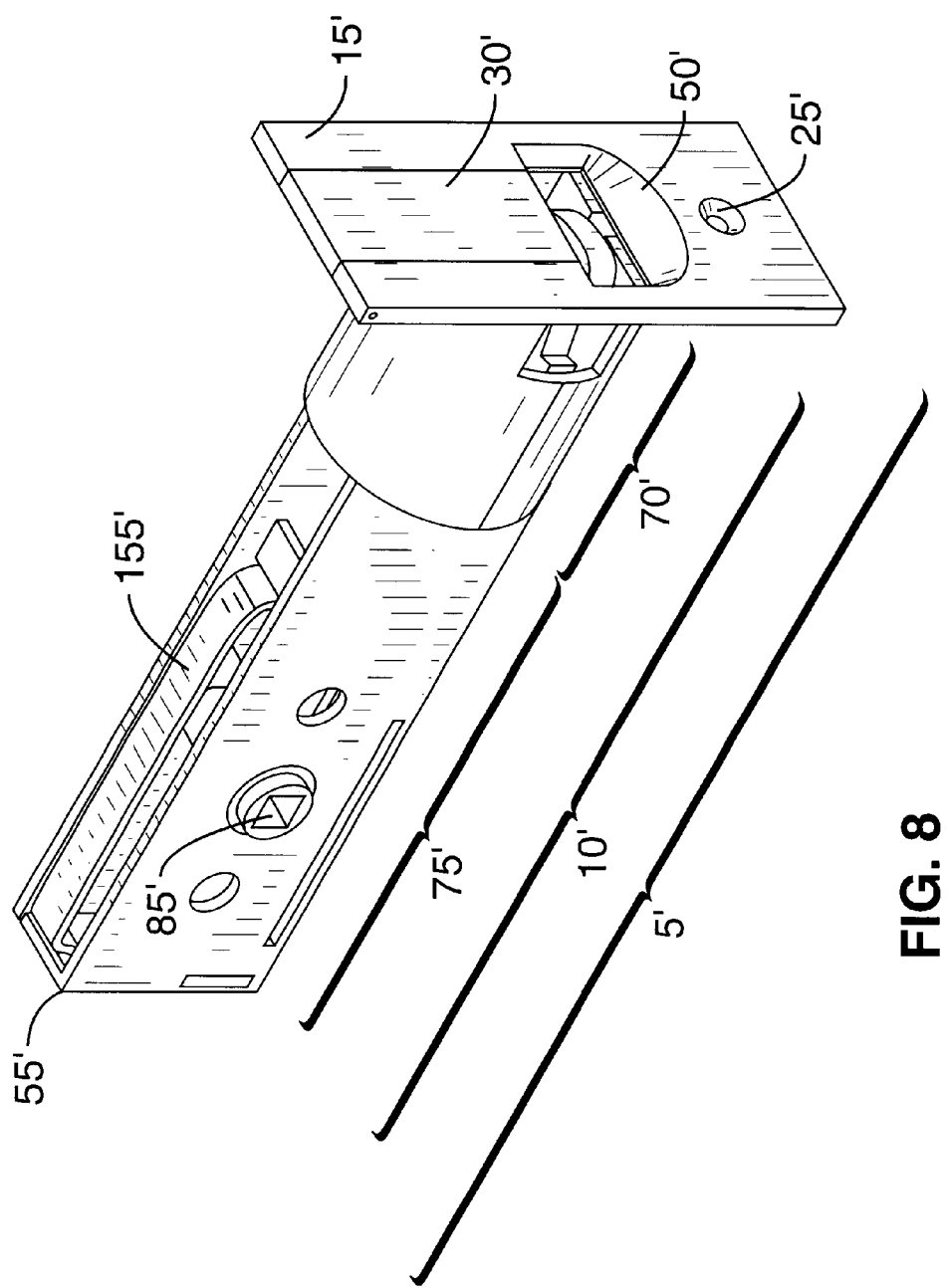
FIG. 8 is a perspective view of a second embodiment of the subject invention.

The housing assembly 10 of the first embodiment of the subject invention has distal 55 and proximal ends, 60, relative to the location of the end plate 15 (see FIGS. 1, 6a, and 6b). The housing assembly comprises two subassemblies: the hook guide assembly 70 and the lever extension and retraction assembly (ER assembly) 75. Exposed on the outer portion of the housing assembly 10, specifically on the ER assembly 75, is a handle socket member 85 for mating with a door latch handle that is user-accessible on the surface of the sliding door. A user rotates the handle to latch and open the door via the subject latch assembly 5.

The components of the ER assembly 75 are best seen in FIGS. 2, 5, and 6a–b. It is stressed that the various components of the ER assembly 75 and for the subject invention in general may be altered to similar or is equivalent versions and still be within the realm of this disclosure. Comprising the ER assembly 75 are first 90 and second 95 frame members that give the basic shape and structural integrity to the ER housing 75. The first 90 and second 95 frame members interconnect to form a box-like container that links with the hook guide assembly 70, usually by means such as tabs 100 and receiving apertures 105 and 110 in the lower frame 115 (see FIG. 3 for a cross sectional view of the lower frame 115 and FIGS. 4a–c for how the hook slides with the lower frame 115 during operation) and upper frame 120 halves of the hook guide assembly 70. Handle socket apertures 125 and 130 are found the first 90 and second 95 frame members, respectfully, for securing the handle socket member 85 for rotation during usage.

Figure 5:
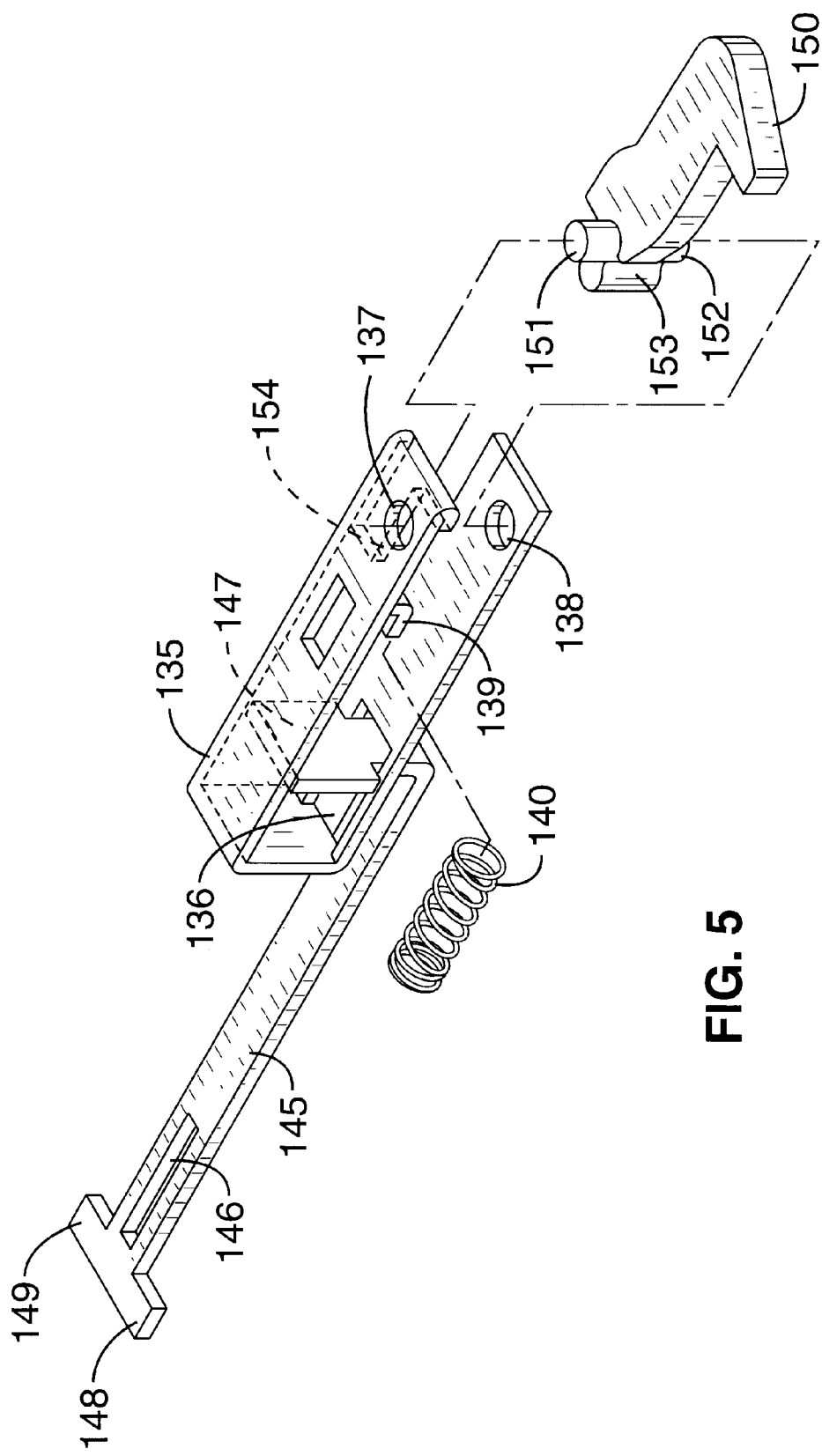
FIG. 5 is a partial exploded view of the first embodiment of the subject invention showing the positioning of the latching hook, spring and bracket, and hook throwing arm.

Within the ER assembly 75 is the strike plate coupling means having a bracket 135, a coil spring 140, a hook throwing arm 145 with slot 146, a hook 150, an elongated spring 155 (fits within the first frame member between suitable anchoring points 156 and 157), and first 160 and second 165 extensions of the handle socket member 85. As seen in FIG. 5, the hook throwing arm 145 has a first terminal with opposing flanges 148 and 149 that slide, during movement of the hook 150, within elongated apertures 191 and 196, respectively, in the first 90 and second 95 frame members, respectively. The second terminal 147 and the arm 145 fits within a receiving aperture 136 in the bracket 135. The coil spring 140 is fitted between the second terminal 147 and a securing pin 139. The hook 150 is pivotally mounted into the bracket 135 by means of interacting pins 151 and 152 and apertures 137 and 138. Additionally, the hook 150, has a cam nub 153 that rides over a guide 154 that extends from the second terminal 147, proximate aperture 137.

Usually, the hook guide assembly, 70 has, as noted above, two halves (lower 115 and upper 120), but other equivalent configurations are considered possible and within the protected bounds of this disclosure. The retracted and extended positions of the subject latch are illustrated in FIGS. 6a and 6b, respectively. FIG. 6a shows the hook 150 retracted into the housing assembly 10 with the handle socket member first extension 160 pressed against the elongated spring 155 and the handle socket member second extension 165 fitted within the arm slot 146. When the handle socket member is turned by a user, via the associated handle on the face of the door, the elongated spring, biased against the first extension 160, distorts and applies resistance that is overcome by continued rotation. The second extension 165 forces the arm 145, the attached bracket 135, and hook 150 outward, into an extended position (see FIG. 6*b* for the extended hook position).

FIGS. 4*a*, 4*b*, and 4*c* illustrate the extension of the hook 150 and how it partially rotates to engage the strike plate. FIG. 4*a* shows the retracted hook 150 connected to the bracket 135 by pin 151 (pin 152 does not show in this view) and fitting completely within the lower frame 115. In FIG. 4*b* the hook 150 has been partially extended and shows the cam nub 153 hitting a stop 200 formed in the lower frame 115 (see FIG. 3 for a cross sectional end view of the lower frame 115 showing the stop 200). As the hook 150 slides by the stop 200 the interaction between the stop 200 and the cam nub 153 swings or partially rotates the hook 150 into a locking position with the cam nub 153 positioned against guide 154. When the hook 150 is drawn, the sloping shoulder 205 of the hook 150 swings or partially rotates the hook 150 into its retracted angle. FIG. 3 shows the channels in which the hook 150 travels.

Also, specifically, a second embodiment of the subject invention is shown in FIGS. 8–11. It is noted that the components that are equivalent between the first and second embodiments are indicated by a primed number. Components aperture 20', aperture 25', finger pull member 30', finger grasping tab 35', pin aperture 40', pin 41', receiving aperture 45', proximal end 60', tab 100', receiving aperture 105', receiving aperture 110', socket aperture 125' and anchoring point 157' are the same as their non-primed counterparts of the first embodiment, and are therefore not discussed in further detail herein. Comprising the second embodiment of the latch assembly 5' are a housing assembly 10' and an edge plate 15'. As in the first embodiment, the housing assembly 10' is positioned next to, beside, or contacting the edge plate 15'.

Figure 9:
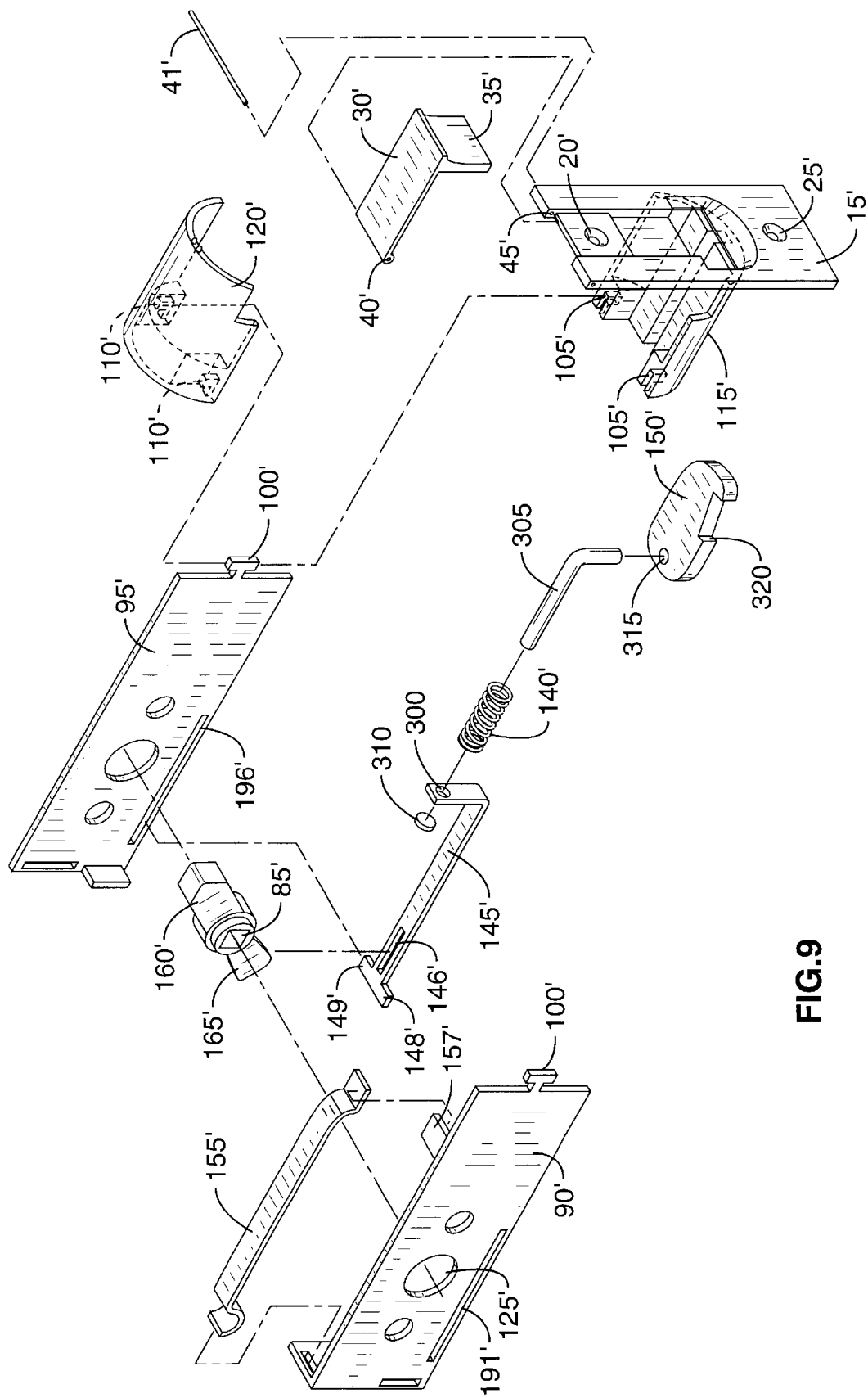
FIG. 9 is an exploded view of a second embodiment of the subject invention.

The differences between the first and second embodiments are found within the ER assembly 75' and hook guide assembly 70' and comprise the exact elements that extend and retract the hook. Within the ER assembly 75' is the strike plate coupling means having, a coil spring 140', a hook throwing arm 145' with slot 146' proximate a first end and an aperture 300 proximate a second end, a L-shaped coupler 305 with an arm attachment means 310, a hook 150' with a coupler receiving aperture 315, an elongated spring 155', and first 160' and second 165' extensions of the handle socket member 85'. As seen in FIG. 9, the hook throwing arm 145' has a first terminal with opposing flanges 148' and 149' that slide, during movement of the hook 150', within elongated apertures 191' and 196', respectively, in the first 90' and second 95' frame members, respectively. At one end of the arm 145' is an aperture 300 for receiving one end of the L-shaped coupler 305. The L-shaped coupler 305 is secured within the aperture 300 by suitable means such as a pin, clip, screw, cap, ring, and other reversible and permanent means. The coil spring 140' is fitted about the L-shaped coupler 305. The hook 150' is pivotally mounted to one end of the L-shaped coupler 305 by means of an aperture 315. Additionally, the hook 150' has a ledge 320.

Figure 11A:
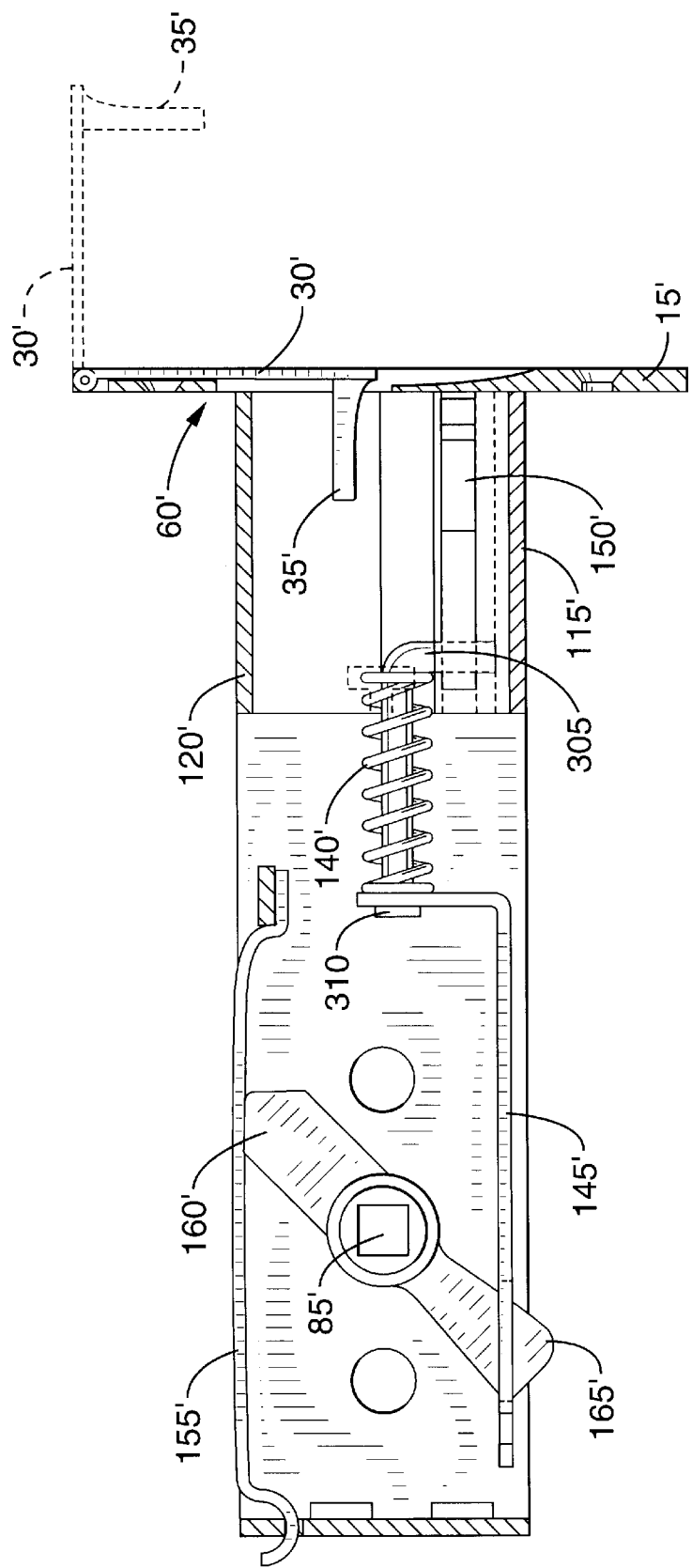
FIG. 11a is a cross sectional view of the second embodiment of the subject invention showing the latching hook in its retracted position and the movement of finger pull.
Figure 11B:
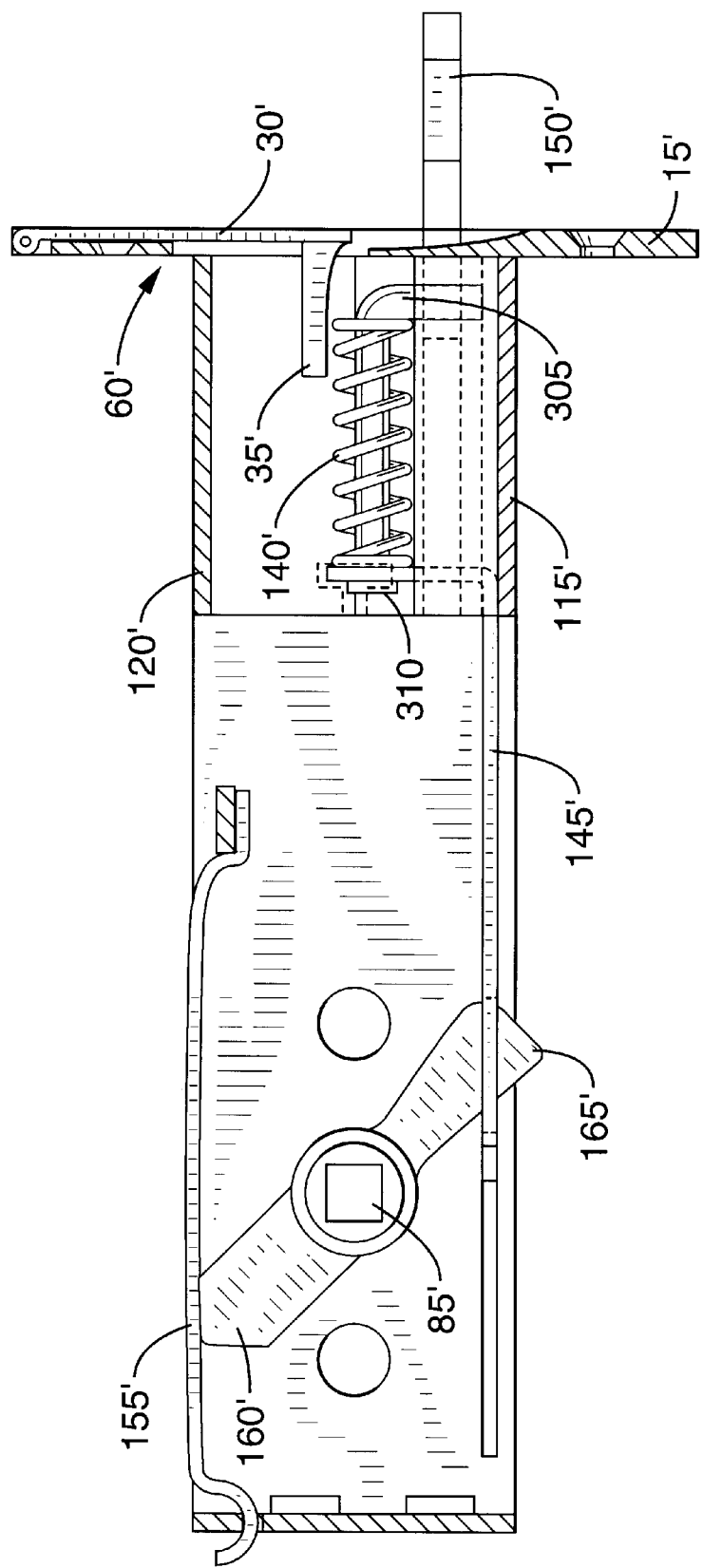
FIG. 11b is a cross sectional view of the second embodiment of the subject invention showing the latching hook in its extended position.

Usually, the hook guide assembly 70' of the second embodiment has, as with the first embodiment, two halves (lower 115' and upper 120'), The retracted and extended positions of the subject latch are illustrated in FIGS. 11*a* and 11*b*, respectively. FIG. 11*a* shows the hook 150' retracted into the housing assembly 10' with the handle socket member first extension 160' pressed against the elongated spring 155' and the handle socket member second extension 165' fitted within the arm slot 146'. When the handle socket member 85' is turned by a user, via the associated handle on the face of the door, the elongated spring, biased against the first extension 160', distorts and applies resistance that is overcome by continued rotation. The second extension 165' forces the arm 145', the L-shaped coupler 305, and hook 150' outward, into an extended position (see FIG. 11*b* for the extended hook position).

Figure 10C:
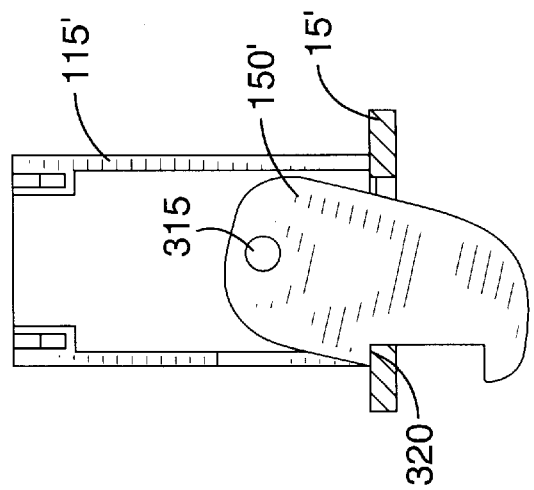
FIG. 10c is a partial top sectional view of the second embodiment of the subject invention showing the latching hook fully extended with the hook rotated into its latching position by means of the stopping tab and stop.
Figure 10B:
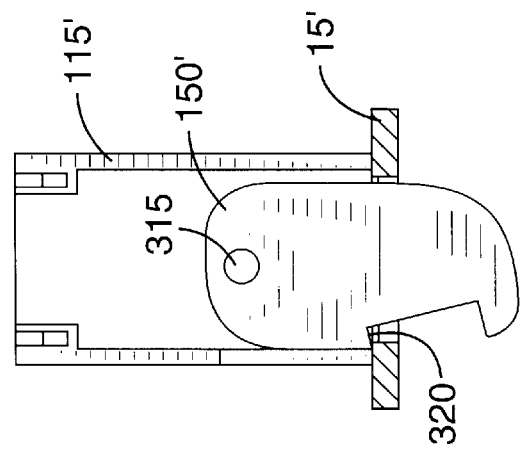
FIG. 10b is a partial top sectional view of the second embodiment of the subject invention showing the latching hook partially extended with the stopping tab hitting the stop.
Figure 10A:
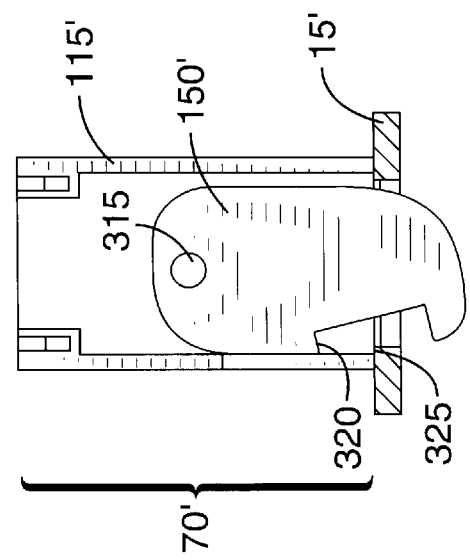
FIG. 10a is a partial top sectional view of the second embodiment of the subject invention showing the latching hook partially extended, but before the stopping tab encounters the stop.

FIGS. 10*a*, 10*b*, and 10*c* illustrate the extension of the hook 150' and how is partially rotates to engage the strike plate. FIG.10*a* shows the retracted hook 150' fitted completely within the lower frame 115'. In FIG. 10*b* the hook 150' has been partially extended and shows the ledge 320 hitting a stop or lip 325 formed at the slightly staggered intersection of the edge plate 15' and the hook guide assembly 70'. As the hook 150' slides by the stop or lip 325 the interaction between the stop or lip 325 and the ledge 320 swing or partially rotate the hook 150' into a locking position. When the hook 150' is withdrawn the angle of the hook 150' between the ledge 320 and the L-shaped coupler 305 attachment aperture 315 swings or partially rotates the hook 150' into its retracted angle.

Typically, a user employs the subject device by mounting in a suitable sliding door that has been prepared by cutting a first bore (preferably a standard hinge-hung door bore of about 2⅛ inch) through a face of the door and a second bore (preferably a standard hinge-hung door bore of about 1") enters from the edge of the door and meets the larger first bore on its perimeter. Additionally, an inset rectangular region is formed in the edge of the door about the second bore for holding an edge plate. Specifically, with the subject invention, the door is accessed by a user via lifting the retracting finger pull. The sliding door is then closed so the door edge contacts the door frame. The latch assembly is then utilized to secure the sliding door to the door frame via the hook and strike plate.

The invention has now been explained with reference to specific embodiments. Other embodiments will be suggested to those of ordinary skill in the appropriate art upon review of the present specification. Also, although the foregoing invention has been described in some detail by way of illustration and example for purposes of clarity of understanding, it will be obvious that certain changes and modifications may be practiced within the scope of the appended claims.

What is claimed is:

1. A sliding door latch assembly for engaging with a door frame placed strike plate, comprising:
   a) an elongated housing assembly having first and second ends that fits within the sliding door apertures;
   b) a rectangular edge plate having means for affixing to an edge of the sliding door and positioning said rectangular edge plate proximate said housing assembly second end;
   c) hooking means associated with said housing assembly for hooking to the strike plate, wherein when hooking to the strike plate a portion of said hooking means extends through said rectangular edge plate;
   d) spring means always biasing said hooking means toward an unhooked position; and
   e) a finger pull means associated with said rectangular edge plate for accessing the sliding door from within a surrounding framework, said finger pull means having:
      i) a finger pull member having first and second ends;
      ii) finger grasping means proximate said finger pull member first end; and iii) face plate attachment means proximate said finger pull member second end.

2. A sliding door latch assembly according to claim 1, wherein said hooking means comprises:
   a) a hook and
   b) means for allowing a user to extend and retract said hook by using a handle wherein said extension and retraction means comprises:
      i) a handle attachment means;
      ii) a biased arm member connected to said handle attachment means;
      iii) means for coupling said biased arm member to said hook; and
      iv) means for engaging, upon extension, and releasing, upon said retraction, said hook with the strike plate.

3. The sliding door assembly according to claim 2, wherein said coupling means comprises:
   a) a bracket fastened to said biased arm member and extending to said hook;
   b) pivot means associated with said hook; and
   c) means associated with said hook and said housing for partially rotating said hook about said pivot means upon extension and retraction of said hook.

4. The sliding door latch assembly according to claim 2, wherein said coupling means comprises:
   a) an L-shaped coupler fastened to said biased arm member and extending to said hook;
   b) pivot means associated with said hook; and
   c) means associated with said hook, said housing, and said edge plate for partially rotating said hook about said pivot means upon extension and retraction of said hook.

5. A sliding door latch assembly for engaging with a door frame placed strike plate, comprising:
   a) an elongated housing assembly having first and second ends that fits within the sliding door;
   b) a rectangular edge plate having a narrower top and bottom borders and wider side borders, and further having:
      i) means for affixing to an edge of the sliding door and positioning said rectangular edge plate proximate said housing assembly second end;
      ii) an upper finger pull mounting channel; and
      iii) a lower aperture for receiving a hook member;
   c) a hook assembly mounted in said housing assembly for releasably hooking to the strike plate, wherein when releasably hooked with the strike plate a portion of said hook assembly extends through said lower aperture;
   d) spring means always biasing said hook assembly towards an unhooked position; and
   e) a finger pull associated with said edge plate for accessing the sliding door from within a surrounding framework, said finger pull having:
      i) a finger full member having first and second ends;
      ii) finger grasping means at said finger pull member first end; and
      iii) face plate attachment means hinged to said edge plate top border.

6. The sliding door latch assembly according to claim 5, wherein said hook assembly comprises:
   a) a hook and
   b) means for allowing a user to extend and retract said hook by using a handle, said extension and retraction means having:
      i) a handle attachment means;
      ii) a biased arm member connected to said handle attachment means;
      iii) means for coupling said biased arm member to said hook; and
      iv) means for engaging, upon extension, and releasing, upon said retraction, said hook with the strike plate.

7. The sliding door latch assembly according to claim 6, wherein said coupling means comprises:
   a) a bracket fastened to said biased arm member and extending to said hook;
   b) pivot means associated with said hook; and
   c) means associated with said hook and said housing for partially rotating said hook about said pivot means upon extension and retraction of said hook.

8. The sliding door latch assembly according to claim 6, wherein said coupling means comprises:
   a) an L-shaped coupler fastened to said biased arm member and extending to said hook;
   b) pivot means associated with said hook; and
   c) means associated with said hook, said housing, and said edge plate for partially rotating said hook about said pivot means upon extension and retraction of said hook.

9. A sliding door latch assembly for engaging with a door frame placed strike plate, comprising:
   A) an elongated housing assembly having first and second ends that fits within the sliding door;
   B) a rectangular edge plate having means for affixing to an edge of the sliding door and positioning said rectangular edge plate proximate said housing assembly second end;
   C) hooking means associated with said housing assembly for hooking to the strike plate, wherein when hooking with the strike plate a portion of said hooking means extends through said rectangular edge plate, said hooking means having:
      i) a hook and
      ii) means for allowing a user to extend and retract said hook by using a handle, said extension and retraction means having:
         a) a handle attachment means;
         b) a biased arm member connected to said handle attachment means;
         c) means for coupling said biased arm member to said hook, said coupling means having:
            i) a bracket fastened to said biased arm member and extending to said hook;
            ii) pivot means associated with said hook; and
            iii) means associated with said hook and said housing for partially rotating said hook about said pivot means upon extension and retraction of said hook; and
         d) means for engaging, upon extension, and releasing, upon said retraction, said hook with the strike plate; and
   D) a finger pull means associated with said edge plate for accessing the sliding door from within a surrounding framework, said finger pull means having:
      i) a finger pull member having first and second ends;
      ii) finger grasping means proximate said finger pull member first end; and
      iii) face plate attachment means proximate said finger pull member second end.

10. A sliding door latch assembly for engaging with a door frame placed strike plate, comprising:

A) an elongated housing assembly having first and second ends that fits within the sliding door;

B) a rectangular edge plate having means for affixing to an edge of the sliding door and positioning said rectangular edge plate proximate said housing assembly second end;

C) hooking means associated with said housing assembly for hooking to the strike plate, wherein when hooking with the strike plate a portion of said hooking means extends through said rectangular edge plate, said hooking means having:
   i) a hook and
   ii) means for allowing a user to extend and retract said hook by using a handle, said extension and retraction means having:
      a) a handle attachment means;
      b) a biased arm member connected to said handle attachment means;
      c) means for coupling said biased arm member to said hook, said coupling means having:
         i) an L-shaped coupler fastened to said biased arm member and extending to said hook;
         ii) pivot means associated with said hook; and
         iii) means associated with said hook, said housing, and said edge plate for partially rotating said hook about said pivot means upon extension and retraction of said hook; and
      d) means for engaging, upon extension, and releasing, upon said retraction, said hook with the strike plate; and D) a finger pull means associated with said edge plate for accessing the sliding door from within a surrounding framework, said finger pull means having:
   i) a finger pull member having first and second ends;
   ii) finger grasping means proximate said finger pull member first end; and
   iii) face plate attachment means proximate said finger pull member second end.

11. A sliding door latch assembly for engaging with a door frame placed strike plate, comprising:

A) an elongated housing assembly having first and second ends that fits within the sliding door;

B) a rectangular edge plate having a narrower top and bottom borders and wider side borders, and further having:
   i) means for affixing to an edge of the sliding door and positioning said rectangular edge plate proximate said housing assembly second end;
   ii) an upper finger pull mounting channel; and
   iii) a lower aperture for receiving a hook member; and C) a hook assembly mounted in said housing assembly for releasably hooking to the strike plate, wherein when releasably hooked with the strike plate a portion of said hook assembly extends through said lower aperture and, said hook assembly having:
   i) a hook and
   ii) means for allowing a user to extend and retract said hook by using a handle, said extension and retraction means having:
      a) a handle attachment means;
      b) a biased arm member connected to said handle attachment means;
      c) means for coupling said biased arm member to said hook, said coupling means having:
         i) a bracket fastened to said biased arm member and extending to said hook;
         ii) pivot means associated with said hook; and
         iii) means associated with said hook and said housing for partially rotating said hook about said pivot means upon extension and retraction of said hook; and
      d) means for engaging, upon extension, and releasing, upon said retraction, said hook with the strike plate; and D) a finger pull associated with said edge plate for accessing the sliding door from within a surrounding framework, said finger pull having:
   i) a finger full member having first and second ends;
   ii) finger grasping means at said finger pull member first end; and
   iii) face plate attachment means hinged to said edge plate top border.

12. A sliding door latch assembly for engaging with a door frame placed strike plate, comprising:

A) an elongated housing assembly having first and second ends that fits within the sliding door;

B) a rectangular edge plate having a narrower top and bottom borders and wider side borders, having:
   i) means for affixing to an edge of the sliding door and positioning said rectangular edge plate proximate said housing assembly second end;
   ii) an upper finger pull mounting channel; and
   iii) a lower aperture for receiving a hook member;

C) a hook assembly mounted in said housing assembly for releasably hooking to the strike plate, wherein when releasably hooked with the strike plate a portion of said hook assembly extends through said lower aperture and, said hook assembly having:
   i) a hook and
   ii) means for allowing a user to extend and retract said hook by using a handle, said extension and retraction means having:
      a) a handle attachment means;
      b) a biased arm member connected to said handle attachment means;
      c) means for coupling said biased arm member to said hook, said coupling means having:
         i) an L-shaped coupler fastened to said biased arm member and extending to said hook;
         ii) pivot means associated with said hook; and
         iii) means associated with said hook, said housing, and said edge plate for partially rotating said hook about said pivot means upon extension and retraction of said hook; and
      d) means for engaging, upon extension, and releasing, upon said retraction, said hook with the strike plate; and D) a finger pull associated with said edge plate for accessing the sliding door from within a surrounding framework, said finger pull having:
   i) a finger full member having first and second ends;
   ii) finger grasping means at said finger pull member first end; and
   iii) face plate attachment means hinged to said edge plate top border.

13. A sliding door latch assembly comprising:

a housing including a frame member;

an edge plate disposed at an end of said housing and having an aperture formed therein;

a finger pull pivotally connected to said edge plate;

a latchbolt assembly disposed in said housing, said latchbolt assembly including a bracket supported by said frame member for movement between a retracted position and an extended position along a first axis, a catch pivotally connected to said bracket and having a hook formed on an end thereof and an actuator connected to said bracket for moving said bracket between said retracted and extended positions;

a hook guide mechanism including a stop engaging said catch as said bracket is moved towards said extended position to rotate said catch from an unlatched position to a latched position about a second axis which is perpendicular to said first axis when said hook extends from said aperture of said edge plate; and said latchbolt assembly further including a spring operably disposed between said bracket and said catch to bias said catch towards said unlatched position.

14. The sliding door latch assembly of claim 13, wherein said catch has a cam formed thereon which engages said stop for positioning said catch between said unlatched and latched positions.

15. The sliding door latch assembly of claim 13, wherein said stop is formed by a lip on said edge plate adjacent said aperture.

16. The sliding door latch assembly of claim 13, wherein said bracket includes an arm having a first end operably coupled to said actuator and a coupler extending from a second end of said arm, said coupler having said catch pivotally connected thereto.

17. The sliding door latch assembly of claim 16, wherein said coupler comprises a U-shaped bracket including a pair of legs having a first aperture formed therethrough and at least one of said pair of legs having a second aperture formed therein, said catch being pivotally connected to said coupler through said first aperture and said arm being connected to said coupler through said second aperture.

18. The sliding door latch assembly of claim 16, wherein said coupler comprises an L-shaped rod having a first leg connected to said arm and a second leg extending generally perpendicular to said first leg and having said catch pivotally connected thereto.

* * * * *